United States Patent Office 3,379,505
Patented Apr. 23, 1968

3,379,505
PROCESS FOR REFORMING HYDROCARBONS EMPLOYING A NICKEL-SEPIOLITE CATALYST COMPOSITION
Peter Desmond Holmes, Old Greenwich, Conn., and Alan Richard Thornhill, Croydon, and Douglas Keith Nicholas, Hampton, England, assignors to the British Petroleum Company Limited, London, England, a company of England
No Drawing. Filed Apr. 22, 1965, Ser. No. 450,196
Claims priority, application Great Britain, May 12, 1964, 19,791/64
9 Claims. (Cl. 23—212)

ABSTRACT OF THE DISCLOSURE

Steam reforming of hydrocarbons and/or the further reaction of the reformed products by the shift reaction or the methanation reaction is carried out over a nickel-sepiolite catalyst. The reactions may be carried out at 250–1000° C., 0–700 p.s.i.g., 0.25–4.0 hydrocarbon space velocity, and 1.5:1–8:1 steam/carbon mole ratio. Production of hydrogen is increased by the use of temperatures of 600–1000° C.; production of methane is favored by temperatures of 250–600° C.

The feedstocks may be $C_{10}$–$C_{20}$ aliphatic hydrocarbons with low sulphur contents of less than 3 p.p.m. The catalyst preferably contains 1–20% weight of nickel, more particularly, 2–10% weight.

---

This invention relates to the steam reforming of hydrocarbons.

The reaction between hydrocarbons and steam to give carbon oxides and hydrogen is a well known reaction which can be exemplified by the following equation, which uses heptane for purposes of illustration:

$$C_7H_{16} + 7H_2O \rightleftharpoons 7CO + 15H_2 \quad (1)$$

Interaction between the various components of the gas mixture can also occur according to the following equations:

$$CO + H_2O \rightleftharpoons CO_2 + H_2 \quad (2)$$
$$CO + 3H_2 \rightleftharpoons CH_4 + H_2O \quad (3)$$

These reactions are often desirable, Reaction 2 being commonly known as the shift reaction and Reaction 3 as the methanisation reaction. Both of them can occur simultaneously with the reforming, or separately. Thus they can be applied to the products of a steam reforming reaction or to gas mixtures obtained in any other way.

There are also at least two further possible side reactions during reforming, that are normally considered undesirable because they deposit carbon on the catalyst. These are:

$$CO + H_2 \rightleftharpoons C + H_2O \quad (4)$$
$$2CO \rightleftharpoons C + CO_2 \quad (5)$$

In recent years, there have been improvements in the steam reforming process directed especially to increasing the space velocity and the pressures used. One of the factors in this improvement has been improvements in the catalysts used, particularly in the support for the active component of the catalyst. This active component is usually nickel. The support used must, in particular, be capable of withstanding the high temperatures used, and must not encourage the undesirable side Reactions 4 and 5 set out above.

It has now been found that a cheap and readily available support can be used in hydrocarbon steam reforming with good results. According to the present invention therefore, a process for reacting hydrocarbons with steam or for simultaneously or separately carrying out Reactions 2 and 3 as hereinbefore defined comprises contacting the reactants under reaction conditions with a catalyst comprising nickel supported on sepiolite.

The theoretical considerations governing the effect of the main process variables on the reversible reactions are as follows. The equilibrium for Equation 1 shifts to the right with increased temperature, but that for Equations 2 and 3 shifts to the left. Increased temperature, therefore, increases the overall conversion but tends to decrease the amount of carbon dioxide and methane produced. The equilibrium for Equation 1 is such that conversions of greater than 99% are possible at temperatures above 600° C.

Pressure affects the equilibria as follows: For Equation 1 increased pressure shifts the equilibria to the left, and for Equation 3 to the right. The equilibrium for Equation 2 is independent of pressure. Thus increased pressure theoretically tends to decrease overall conversion but increase the methane content.

The other main process variables are the space velocity of the hydrocarbon feedstock and the steam/carbon mole ratio. Variation in space velocity will have the usual effect, increase in space velocity tending to decrease the conversion since the residence time will be less and the time allowed for reaching equilibrium thus also less. An excess of steam over the theoretical necessary will favour a shift to the right in the case of Equations 1 and 2 and to the left in Equation 3. Increase of the steam/carbon ratio will, however, reduce the throughput of hydrocarbon for a given total throughput.

The less desirable reactions of Equations 4 and 5 are reduced by increase of steam/carbon ratio.

Having regard to the considerations set out above the temperatures and pressures may be selected from the following ranges:

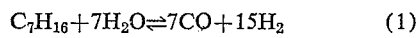

Temperature _____ ° C__ 250–1000
Pressure _____ p.s.i.g__ 0–700

When the feedstock contains hydrocarbons and steam, the liquid hourly space velocity of the hydrocarbon may be 0.25–4.0 v./v./hr. and the steam/carbon mole ratio may be 1.5:1–8:1.

When the predominant reaction is to be hydrogen production from hydrocarbons and steam the preferred conditions are:

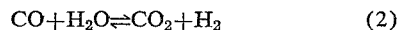
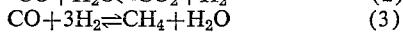

Temperature _____ ° C__ 600–1000
Pressure _____ p.s.i.g__ 200–700
Liquid hourly space velocity _____ v./v./hr__ 0.5–2.0
Steam/carbon mole ratio _____ 2:1–4:1

In general, the temperature, pressure and space velocity are kept as high as possible, and the steam/carbon mole ratio kept as low as possible, consistent with the desired conversion and the minimum deposition of carbon.

When it is desired to produce a methane rich gas from hydrocarbons and steam. The preferred conditions are:

Temperature _____ ° C__ 250–600
Pressure _____ p.s.i.g__ 0–700

The other reaction conditions may be similar to those for hydrogen production given above.

When it is desired to produce a methane rich gas from carbon moxide and hydrogen, the process conditions may be:

Temperature _____ ° C__ 250–600
Pressure _____ p.s.i.g__ 0–700

The $H_2/CO$ mole ratio can vary widely depending on the circumstances but, for complete conversion of carbon monoxide, the ratio should clearly be at least 3:1.

The feedstock may be any convenient hydrocarbon or mixture of hydrocarbons, but the hydrocarbons are preferably aliphatic and also acyclic. The carbon number range may conveniently be from $C_1$ to $C_{20}$, preferably $C_1$ to $C_{10}$. Particularly suitable feedstocks are petroleum fractions boiling within the range 30 to 250° C. As the number of carbon atoms increase, the tendency to carbon deposition increases. Space velocities may thus be lower and steam/carbon mole ratios higher as the carbon number of the feedstock increases.

The catalyst used is sensitive to sulphur, so that when sulphur compounds are present, the feedstock is desirably pretreated to remove the sulphur by, for example, hydrofining or autofining. Preferably the sulphur content of the feed is less than 3 p.p.m. by weight, more particularly less than 1 p.p.m.

The hydrocarbon steam reforming process may be carried on continuously or discontinuously depending on the rate at which the catalyst becomes deactivated during use. Desirably, however, the catalyst is used continuously.

Sepiolite is a commercially available clay mineral, which occurs naturally and which can also be prepared synthetically. It has the ideal formula $$H_4Mg_9Si_{12}O_{30}(OH)_{10} \cdot 6H_2O$$

and is also known as Meerschaum. Further information on sepiolote and its properties may be found in "Chemistry and Industry" of Nov. 16, 1957, at pages 1492 to 1495.

U.K. patent specification No. 899,652 discloses a catalyst comprising nickel or a nickel compound supported on a base consisting essentially of sepiolite and the use of such a catalyst for the hydrogenation or organic compounds, particularly the selective hydrogenation of gasolines. The complete specification of U.K. patent application No. 46903/62 describes a modification of the catalyst of U.K. Patent No. 899,652 in that the catalyst contains at least 0.1% weight perferably 0.1 to 5% weight, of an added alkali metal or alkaline earth metal. The composition and preparation of the catalyst for use in the present invention may follow the same broad lines as are indicated in these prior specifications.

Thus the nickel on sepiolite may be used in the form of granules, pellets, spheres or rods and as a fixed, moving or fluidised bed. A fixed bed is normally satisfactory and is preferred.

The amount of nickel, expressed as elemental nickel, may be from 1 to 50% weight., by weight of total catalyst. Relatively low nickel contents have found to catalyse the reaction effectively, and, in certain cases, to reduce carbon deposition and the preferred nckel contents are from 1 to 20% weight, more particularly from 2 to 10% weight.

Preferably nickel, or a compound thereof, and sepiolite are the sole components of the catalyst.

It has been found that, under the operating conditions, the nickel is predominantly elemental nickel and this applies irrespective of whether the catalyst is initially in this form, or in the form of nickel oxide, or nickel formate. Provided, therefore, that the form of the nickel is initially one that can be reduced to nickel under the operating conditions the precise initial form is not critical.

However, it has been found that, with operations in the range 600 to 1000° C., prereduction of the nickel compound with hydrogen or a hydrogen-steam mixture at a temperature of 800 to 1000° C. is beneficial.

The following are examples of suitable catalyst preparations.

(a) The catalyst may be prepared on the base by an impregnation technique by dissolving in water a nickel salt, for example nickel nitrate, and impregnating the sepiolite with it. The sepiolite may be conveniently in the form of granules, pellets, speres or rods. After impregnation, the catalyst is dried and is then in a form in which it can be stored if desired for long periods, without deterioration. In order to use the catalyst, it must be heated to decompose the salt and the nickel will be converted to the oxide.

(b) The catalyst may be prepared by milling dry nickel formate with powdered sepiolite, and the mixture subsequently pelleted. The advantage of this method of preparation is that a salt such as nickel formate can be converted directly to nickle at a temperature of 150° to 300° C., preferably about 250° C., for example by heating in a stream of hydrogen.

(c) The catalyst may be prepared by a technique which utilises the complex, nickel amine formate, $$Ni(NH_3)_6(HCOO)_2,$$

which is formed when nickel formate is dissolved in ammonia solution. This complex breaks down on heating to give nickel formate again. By using this complex, catalysts may be prepared by the impregnation technique from normally water insoluble compounds such as nickel formate. To prepare a catalyst by this method nickel formate is dissolved in ammonia solution, and the solution used for the impregnation of the sepiolite. The catalyst is then dried, and further procedure may be as described under (b).

In all the preparations, it may be desirable to heat the sepiolite to a temperature at least as high as the temperature at which it is to be subsequently used. Any shrinkage there may be or heating thus occurs before use.

The catalyst is preferably in the form of nickel formate on sepiolite initially, but, as stated above, it may be in the form of nickel oxide or it may be in reduced form prior to starting the reforming process. Any prereduction should, however, be carried out in situ in the reactor because of the pyrophoric nature of elemental nickel.

The catalyst used in the process of the present invention can be regenerated by an oxidative burn-off technique following standard procedure. The nickel is converted to nickle oxide during the oxidative treatment and may, if necessary, be reduced to nickel again before recommencing the process.

The hydrocarbon/steam reforming process may be used for the production of:
(a) hydrogen,
(b) towns gas or towns gas components,
(c) synthesis gas.

The compositions of the product and hence the balance between Reactions 1, 2 and 3 will depend on the use for which the product is required.

Where the product is required primarily as a source of hydrogen, the process is preferably operated at a high temperature of 600–1000° C. to encourage Reaction 1. The product may, if desired, be subsequently treated in known manner to remove the carbon oxides.

Where a methane rich gas is required, for example for towns gas, the process is preferably operated at a lower temperature of 250–600° C. to encourage Reactions 3.

Also included within the present invention are multistage processes, using two or more reactors containing the nickel-sepiolite catalyst. A particularly suitable process would be a two stage process in which the first reactor was operated under conditions favouring Reaction 1 and the second reactor operated under conditions favouring Reaction 2 and/or Reaction 3.

The invention is illustrated by the following examples.

EXAMPLE 1

Pure n-heptane and steam were reformed under the following conditions in a micro reactor:

Temperature _____ 600, 700, 800, 900° C.
Pressure _____ Atmospheric.
Heptane space velocity _____ 1 LHSV.
Steam/carbon mole ratio ___ 4:1.
Duration _____ 1 hour at each temperature.

Two catalysts were used. One was 10% weight nickel (expressed as elemental nickel) on sepiolite prepared by calcining sepiolite granules at 550 C., impregnating with an aqueous ammoniacal solution of nickel formate to a nickel content of 10% weight and drying the impregnated sepiolite at 110° C. The other catalyst, which was used for comparative purposes was a commercial catalyst of 5% weight nickel on ceramic.

Both catalysts were reduced by the hydrocarbon at temperatures from 700° C. upwards and gas formation commenced. (The runs at 600° C. were carried out after the runs at 900° C.).

The runs showed that the nickel on sepiolite catalyst behaved satisfactorily and gave a high conversion to gas of about 300 B.t.u./cu. ft. at temperatures between 700 and 900° C. Operation was steady and decreasing methane and increasing carbon monoxide contents were observed with increasing temperatures in accord with the equilibria of the following reactions:

$$C_7H_{16}+7H_2O \rightleftharpoons 7CO+15H_2$$
$$CO+H_2O \rightleftharpoons CO_2+H_2$$
$$CO+3H_2 \rightleftharpoons CH_4+H_2O$$

In comparison the commercial catalyst gave less steady operation and the results suggest the laydown of carbon. This would account for the high hydrogen content of the run at 600° C.

The results obtained are shown in Table 1 below.

TABLE 1

| Catalyst | Commercial Catalyst | | | | Nickel on Sepiolite | | | |
|---|---|---|---|---|---|---|---|---|
| Temperature, °C | 600 | 700 | 800 | 900 | 600 | 700 | 800 | 900 |
| Gas make (l. gas at NTP per ml. feed) | 1.75 | 2.78 | 3.66 | 3.78 | 2.16 | 3.69 | 3.86 | 3.70 |
| Gas Composition, mol percent: | | | | | | | | |
| $H_2$ | 79.8 | 68.7 | 70.2 | 70.8 | 72.4 | 73.9 | 75.3 | 70.4 |
| CO | 5.6 | 21.3 | 22.2 | 16.4 | 5.7 | 10.5 | 13.7 | 19.8 |
| $CO_2$ | 13.5 | 9.8 | 7.1 | 12.7 | 17.3 | 15.2 | 11.0 | 9.8 |
| $CH_3$ | 1.1 | 0.2 | 0.5 | 0.1 | 4.6 | 0.4 | Trace | Trace |

Subsequent experiments extending the duration of the run to 6 hours indicated that the catalyst showed tolerance to carbon deposition and maintenance of a high surface area even at a temperature of 900° C.

EXAMPLE 2

This example compares the effect of varying the nickel content of the catalyst.

Runs were carried out in a micro-reactor containing 2 ml. of catalyst under the following conditions:

Temperature _____ 750° C.
Pressure _____ Atmospheric.
Steam/carbon mole ratio ____ 4:1.
Liquid hourly space velocity __ 1.0.
Feedstock _____ n-heptane with 4.5 p.p.m. by weight of sulphur.

The catalysts used were initially nickel oxide on sepiolite. The nickel contents (expressed as elemental nickel) and the results obtained are shown in Table 2 below.

TABLE 2

| | Nickel content of Catalyst, percent wt. | | | | |
|---|---|---|---|---|---|
| | 1 | 2.5 | 5 | 10 | 15 |
| Gas yield (in litres at NTP ml. feed) at— | | | | | |
| ½ hour | 0.20 | | 3.29 | 3.80 | 3.00 |
| 1 hour | | | 3.65 | | 3.43 |
| 1½ hours | | | | | |
| 2 hours | | | 3.60 | 3.38 | 1.88 |
| 2½ hours | | | | | 1.45 |
| 3 hours | | | 3.92 | 2.83 | |
| 3½ hours | | | | | |
| 4 hours | | | 3.39 | | |
| 4½ hours | | | | | |
| 5 hours | | | 2.87 | | |

The runs were concluded at the times indicated when the back pressure exceeded 10 p.s.i.g., indicating substantial carbon deposition. In the run with the 2.5% weight nickel catalyst the back pressure after 5 hours was only 3.5 p.s.i.g.

The results show the longer operation possible with the 2.5% weight nickel on sepiolite catalyst as compared with those containing 5, 10 and 15% weight nickel. The catalyst with 1% weight nickel had little or no conversion activity and the gas produced contained cracked products only.

EXAMPLE 3

The accelerated tests in the micro-reactor given in Example 2 showed that the 2½% weight nickel-sepiolite catalyst was superior to the 10% weight nickel-sepiolite catalyst.

The result was confirmed on a laboratory scale reactor using 20 ml. catalyst of 12–18 B.S.S. mesh.

The conditions used were:

Temperature _____ 800° C.
Feed _____ Heptane (0.8 p.p.m. sulphur by weight).
Liquid hourly space velocity ___ 0.5 v./v./h.
Steam/carbon mole ratio _____ 4:1.
Pressure _____ Atmospheric.

The results obtained were:

10% wt. nickel-sepiolite

100% conversion of heptane was obtained to gas of the following composition expressed as percent volume. $H_2$, 69.1; CO, 13.7; $CO_2$, 17.2; $CH_4$, nil. After 90 hours on stream the inlet pressure had risen by 9 p.s.i.g. due to carbon lay-down on the catalyst.

2½% wt. nickel-sepiolite

100% conversion of heptane was obtained to gas of the following composition expressed as percent volume. $H_2$, 72.3; CO, 13.5; $CO_2$, 14.2; $CH_4$, nil. After 270 hours on stream the inlet pressure had only risen by 2.3 p.s.i.g.

In a further run under pressure with a 2½% weight nickel-sepiolite catalyst the amount of catalyst used was 10 ml. and the process conditions were:

Temperature _____ 800° C.
Feed _____ Heptane (0.2 p.p.m. sulphur by weight).
Liquid hourly space velocity ____ 1 v./v./h.
Steam carbon mole ratio _____ 4:1.
Pressure _____ 175 p.s.i.g.

The catalyst gave 100% heptane conversion for 100 hour on stream without any appreciable increase in inlet pressure.

EXAMPLE 4

This example shows the improvement in conversion and decrease in carbon deposition at 500° C. on going from atmospheric to 400 p.s.i.g. pressure.

The catalyst used was 10% weight nickel on sepiolite and the process conditions were:

Temperature _____ 500° C.
Steam/carbon mole ratio _____ 4:1.
Liquid hourly space velocity ____ 1.0.
Feedstock _____ n-Heptane (5 p.p.m. sulphur by weight).

Results obtained at three different pressures are given in Table 3 below:

TABLE 3

| | Conversion, Percent | Carbon on Catalyst After 6 HOS, Percent wt. |
|---|---|---|
| Pressure: | | |
| Atmospheric | 68 | 7.87 |
| 200 p.s.i.g | 100 | 0.37 |
| 400 p.s.i.g | 100 | 0.13 |

The beneficial effects of operating with the nickel on sepiolite catalyst at 400 p.s.i.g. pressure were confirmed in a longer run using as feedstock a 55–190° C. boiling range gasoline containing 90% weight of saturated hydrocarbons, 10% weight of aromatic hydrocarbons and 1 p.p.m. by weight of sulphur.

The process conditions were: 550° C. temperature, 400 p.s.i.g. pressure, 1 LHSV, and a steam/carbon mole ratio of 3.5–4.0:1. 100% conversion was obtained initially and after 200 hours on stream the conversion was still 90%.

EXAMPLE 5

This example compares a nickel on sepiolite catalyst with a commercial steam reforming catalyst.

The nickel on sepiolite catalyst contained 2.5% weight of nickel. The commercial catalyst was a nickel containing catalyst recommended by the steam reforming of $C_3$ and $C_4$ hydrocarbons.

The conditions used for each catalyst were:

Pressure _____ Atmospheric.
Steam/carbon mole ratio __ 4:1.
Liquid hourly space velocity _____ 1.0.
Feedstock _____ n-Heptane (less the 0.5 p.p.m. sulphur by weight).

The temperatures used and the results obtained are shown in Table 4 below:

TABLE 4

| | Catalyst | |
|---|---|---|
| | Nickel on sepiolite | Commercial |
| Length of run, hrs | 6 | 1¾ |
| Rate of pressure rise, p.s.i.g./hr | 0 | 2.3 |
| Average Gas Yield, litres at NTP/ml. feed | 4.00 | 3.06 |
| Gas Composition: | | |
| $H_2$ | 72.3 | 72.0 |
| CO | 11.5 | 14.0 |
| $CO_2$ | 15.6 | 12.2 |
| $CH_4$ | 0.6 | 1.8 |
| Temperature of catalyst | 700 | 750 |

At 700° C., the commercial catalyst gave a gas yield of less than 0.2 litre/ml. of feed.

The results show that the commercial catalyst, although suitable for $C_3$ and $C_4$ feedstocks, was not as effective as nickel on sepiolite for treating a higher boiling $C_7$ feedstock.

EXAMPLE 6

This example shows the effect of the steam carbon mole ratio on the carbon deposited. The catalyst and process conditions used were:

Catalyst _____ 10% wt. nickel on sepiolite.
Temperature _____ 550° C.
Pressure _____ 400 p.s.i.g.
Liquid hourly space velocity ____ 1.0.
Feedstock _____ n-Heptane (5 p.p.m. of sulphur by weight).

Runs were carried out at different steam/carbon mole ratios. In all cases 100% conversion was obtained but other results differed as shown in Table 5 below:

TABLE 5

| | Steam/Carbon, mole ratio | | | |
|---|---|---|---|---|
| | 3.94 | 3.1 | 1.94 | 1.01 |
| Volume of gas, litres per ml. of feed | 1.67 | 1.59 | 1.43 | 1.25 |
| Gas Analysis, Mole percent: | | | | |
| Hydrogen | 33.6 | 28.1 | 22.4 | 14.8 |
| Carbon Monoxide | 0.4 | 0.8 | 0.6 | 1.4 |
| Carbon Dioxide | 20.6 | 19.9 | 19.5 | 18.2 |
| Methane | 45.4 | 51.2 | 57.5 | 65.6 |
| Carbon on catalyst up to 6 hours of stream, percent wt. | 0.09 | 0.36 | 0.36 | 4.1 |

EXAMPLE 7

This example shows the use of a nickel-sepiolite catalyst for Reaction 3, the methanisation reaction.

Three nickel catalysts were used as follows:
(i) nickel oxide on Corundum.
(ii) nickel oxide on kieselguhr.
(iii) nickel formate on sepiolite.

Each catalyst was activated by reducing the nickel compound to nickel in a stream of hydrogen. The hydrogen space velocity was 1000 v./v./hr., the duration 4 hours and the temperature 500° C. for the nickel oxides and 250° C. for the nickel formate.

They were then used for converting a 2:1 molar water/methanol mixture to a hydrogen/carbon monoxide (2:1 molar) mixture at 1 v./v./hr. (based on methanol), atmospheric pressure and various temperatures. The onset of methanisation of the carbon monoxide was observed when the reaction changed from an endothermic reaction (methanol cracking only) to an exothermic (methanisation). Compositions of the gaseous products are given in Table 6 below.

TABLE 6

| | Catalyst | | | | | | | | |
|---|---|---|---|---|---|---|---|---|---|
| | Nickel Oxide on Corundum | | | Nickel Oxide on Kieselguhr | | | Nickel Formate on Sepiolite | | |
| | Wt. Percent Ni | | | | | | | | |
| | 5.4 | | | 38.2 | | | 10.0 | | |
| | Activation Temperature, ° C. | | | | | | | | |
| | 500 | | | 500 | | | 250 | | |
| Furnace Block Temp., ° C. | 240 | 280 | 320 | 240 | 260 | 261 | 240 | 280 | 312 |
| Catalyst Mid-bed Temp., ° C. | 240 | 271 | 295 | 218 | 275 | 236 | 222 | 245 | 376 |
| Methanol Conversion (Mol Percent) | 17 | 38 | 70 | 58 | 90 | 73 | 38 | 81 | 95 |
| Product Gas (Mol Percent): | | | | | | | | | |
| $H_2$ | 65.2 | 65.7 | 68.0 | 63.5 | 34.7 | 55.7 | 66.8 | 65.0 | 22.9 |
| CO | 30.5 | 31.6 | 29.3 | 31.1 | Nil | 21.7 | 31.4 | 31.0 | Nil |
| $CO_2$ | 2.5 | 1.7 | 1.5 | 1.3 | 20.6 | 8.2 | 1.8 | 2.0 | 24.4 |
| $CH_4$ | 1.8 | 1.0 | 1.2 | 3.8 | 44.7 | 14.2 | Tr. | 2.0 | 52.7 |
| Mid-bed temperature at which onset of methanisation was noticed | Not below 300° C. | | | 255–260° C. | | | 255–260° C. | | |

These results showed that the nickel-on-sepiolite catalyst was more active than the Corundum based catalyst. Similar results were obtained with the kieselguhr based catalyst but this catalyst contained appreciably more nickel.

We claim:
1. A process for reacting hydrocarbons with steam to produce a gaseous reaction product containing at least one compound selected from the group consisting of hydrogen, methane, and oxides of carbon which comprises contacting the hydrocarbon containing less than 3 p.p.m. of sulphur with steam in the presence of a catalyst comprising from 1 to 50% weight of nickel, expressed as elemental nickel by weight of total catalyst, on a support consisting essentially of sepiolite, at a temperature from about 250–1000° C., at a pressure of from 0–700 p.s.i.g., a liquid hourly space velocity of from 0.25–4.0 v./v./hr., and at a steam/carbon mole ratio of from 1.5:1–8:1, and recovering a gaseous product containing at least one material selected from the group consisting of hydrogen, methane, and oxides of carbon.

2. A process as claimed in claim 1, wherein the temperature is from 600 to 1000° C. and the pressure from 200 to 700 p.s.i.g.

3. A process as claimed in claim 1 wherein the feedstock contain aliphatic hydrocarbons having from 1 to 20 carbon atoms.

4. A process as claimed in claim 3 wherein the aliphatic hydrocarbons have from 1 to 10 carbon atoms.

5. A process as claimed in claim 3 wherein the feedstock is a petroleum fraction boiling in the range 30 to 250° C.

6. A process as claimed in claim 1 wherein the catalyst contains from 1 to 20% weight of nickel.

7. A process as claimed in claim 6 wherein the catalyst contains from 2 to 10% weight of nickel.

8. A process as claimed in claim 1 wherein, under the operating conditions, nickel and sepiolite are the sole components of the catalyst.

9. A process for reacting carbon monoxide with hydrogen to produce a gaseous reaction product containing methane, which comprises contacting the carbon monoxide containing less than 3 p.p.m. of sulphur with hydrogen in the presence of a catalyst comprising from 1 to 50% weight of nickel, expressed as elemental nickel by weight of total catalyst, on a support consisting essentially of sepiolite, at a temperature from about 250–600° C., and at a pressure of from 0–700 p.s.i.g., and recovering a gaseous product containing methane.

References Cited

UNITED STATES PATENTS

| | | | |
|---|---|---|---|
| 3,115,394 | 12/1963 | Gorin et al. | 23—212 |
| 3,278,268 | 10/1966 | Pfefferle | 23—212 |

OSCAR R. VERTIZ, *Primary Examiner.*

EDWARD STERN, *Examiner.*